US006005840A

United States Patent [19]

Awater et al.

[11] Patent Number: 6,005,840

[45] Date of Patent: Dec. 21, 1999

[54] COMPLEMENTARY ENCODING AND MODULATION SYSTEM FOR USE IN AN ORTHOGONAL FREQUENCY DIVISION MULTIPLEXING TRANSMITTER SYSTEM AND METHOD THEREOF

[75] Inventors: Geert Arnout Awater, Utrecht; Richard D. J. van Nee, De Meern, both of Netherlands

[73] Assignee: Lucent Technologies Inc., Murray Hill, N.J.

[21] Appl. No.: 08/834,667

[22] Filed: Apr. 1, 1997

[51] Int. Cl.[6] .................................................... H04L 27/10

[52] U.S. Cl. ............................................ 370/206; 375/279

[58] Field of Search .................................... 370/203, 206, 370/208, 209, 483, 210, 215; 375/200, 204, 209, 214, 242, 268, 279, 264, 251

[56] References Cited

U.S. PATENT DOCUMENTS

| | | | |
|---|---|---|---|
| 5,636,247 | 6/1997 | Kamerman et al. | 375/260 |
| 5,694,389 | 12/1997 | Seki et al. | 370/208 |
| 5,732,068 | 3/1998 | Takahashi et al. | 370/206 |
| 5,841,813 | 11/1998 | Van Nee | 375/279 |

OTHER PUBLICATIONS

"Complementary Series", by Marcel J. E. Golay *IRE Transactions On Information Theory.* pp. 82–87.

*Primary Examiner*—Chi H. Pham
*Assistant Examiner*—Kim T. Nguyen

[57] ABSTRACT

The combined complementary encoder and modulation system for an OFDM transmitter system combines complementary coding and modulation and exploits the similarity of their mathematical structure to reduce implementation complexity. In doing so, the improved OFDM transmitter system uses complementary codes to reduce the power-to-average power (PAP) ratio of the transmitted signal. Additionally, the combined complementary encoder and modulation system can be modified to provide scaleablity, which allows a transmitter to operate in various transmission environments. More precisely, scaleability refers to the transmitter's capability to adapt the bit rate of the data, so as to satisfy varying signal bandwidth, delay spreads, tolerance and signal-to-noise ratio requirements.

27 Claims, 5 Drawing Sheets

COMPLEMENTARY ENCODING AND MODULATION SYSTEM FOR USE IN AN ORTHOGONAL FREQUENCY DIVISION MULTIPLEXING TRANSMITTER SYSTEM AND METHOD THEREOF

BACKGROUND OF THE INVENTION

1. Field of The Invention

This invention relates to communication systems and, more particularly, to an OFDM (Orthogonal Frequency Division Multiplexing) transmitter system that uses complementary codes.

2. Description of Related Art

In general, orthogonal frequency multiplexing (OFDM) is a block-oriented modulation scheme that maps N data symbols into N orthogonal carriers separated by a distance of 1/T, where T is the block period. As such, multi-carrier transmission systems use OFDM modulation to send data bits in parallel over multiple, adjacent carriers (also called tones or bins). An important advantage of multi-carrier transmission is that inter-symbol interference due to signal dispersion (or delay spread) in the transmission channel can be reduced or even eliminated by inserting a guard time interval between the transmission of subsequent symbols, thus avoiding an equalizer as required in single carrier systems. The guard time allows delayed copies of each symbol, arriving at the receiver after the initial signal, to die out before the succeeding symbol is received.

An OFDM modulator converts a serial data stream into a block of N complex carriers at a rate of $f_{block}=f_s/N$ where $f_s$ is the data rate of the serial bit stream. The sum of the individual carriers, of which both phase and amplitude can be modulated, correspond to a time domain wave form that can be generated using an Inverse Discrete Fourier Transform (IDFT). The Inverse Fast Fourier Transform (IFFT) is a well-known efficient implementation of the IDFT that performs an N-point IDFT transform.

The guard time is inserted into the output of the IDFT and filled in with a copy of the symbol (called a cyclic prefix) to preserve the orthogonality between carriers. The resulting wave form is then convolved with a time window function that provides a gradual ramp-up and down of the symbols in the time domain to ensure a sharp spectrum cut-off in the frequency domain. The latter is particularly important for wireless application where spectrum rules restrict interference due to out-of-band pollution.

A drawback of the OFDM technique is that the peak-to-average power (PAP) ratio of the signal increases as the number of carriers is increased. The increase in the PAP ratio due to the increased number of carriers therefore requires linearity of the transmission. In a wireless channel, for example, highly linear power amplifiers can be used to deal with the PAP ratio problem. These linear power amplifiers, however, are not very power efficient, and the power efficiency issue is a drawback for mobile, portable applications where the power amplifiers are likely to be powered by more costly batteries of limited capacity.

Thus, a need exists for an OFDM transmitter which can efficiently and cost effectively reduce the PAP ratio of transmission signals to provide the benefits of OFDM while reducing the above problems.

SUMMARY OF THE INVENTION

The combined complementary encoding and modulation system for an OFDM transmitter system according to the principles of the present invention encodes data signals using complementary codes to reduce the PAP ratio of the transmitted signals. The combined complementary encoding and OFDM modulation efficiently and cost effectively generates complementary carrier signals for the OFDM transmitter by combining and concurrently performing complementary code encoding and OFDM modulation. The complementary encoding and OFDM modulation system accomplishes this by exploiting the similarity of the mathematical structure used for complementary code encoding and OFDM modulation. Additionally, the combined complementary encoding and modulation system can be modified to provide scaleablity, which allows the OFDM transmitter to operate in various transmission environments.

The scaleability feature of the OFDM transmitter system using the combined complementary encoding and modulation system permits scaling of the operating parameters and/or characteristics of the OFDM transmitter system. For example, control circuitry can scale the bit rate through the manipulation of the OFDM symbol duration, the number of carriers, and/or the number of bits per symbol per carrier. By scaling the operating parameters and/or characteristics of the OFDM transmitter system when the control circuitry determines that different operating parameters and/or characteristics are advantageous, the control circuitry can dynamically change the operating parameters and/or characteristics for the OFDM transmitter. For example, by adapting the bit rate, widely varying signal bandwidth, delay spreads tolerance and signal-to-noise ratio requirements can be achieved. The scaling feature allows the OFDM transmitter using the combined complementary encoding and modulation system to operate in a variety of environments. As such, the OFDM transmitter is particularly suitable for application in mobile, wireless communication devices, which support a variety of services, in a variety of environments, indoor as well as outdoor and in radio channels with differing bandwidth.

Particular embodiments of the combined complementary encoding and modulation system can be advantageously used if the implementation technology favors additions, either because they are cheap, small, fast, or have good power efficiency. Other embodiments can be advantageously used if table look-ups or multiplications, respectively, have these benefits. Some embodiments scale linearly in complexity with the number of carriers. Other embodiments scale logarithmically in complexity with the number of carriers and use multiplications.

BRIEF DESCRIPTION OF THE DRAWINGS

Other aspects and advantages of the present invention may become apparent upon reading the following detailed description and upon reference to the drawings in which.

DETAILED DESCRIPTION

Figure 1:
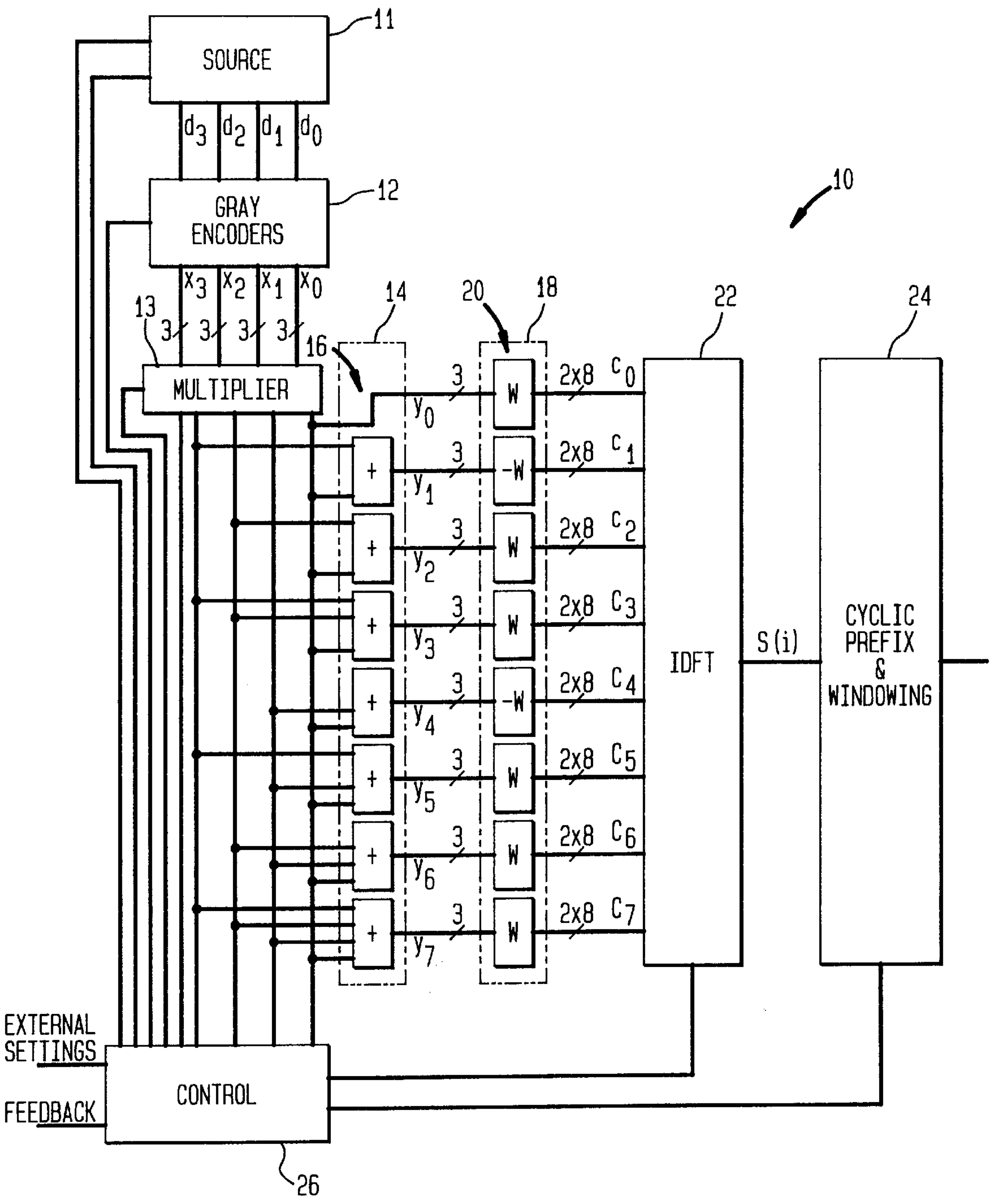
FIG. 1 shows a block diagram of an embodiment of a complementary encoding and modulation system for an OFDM transmitter according to certain principles of the present invention.

Illustrative embodiments of the complementary encoding and modulation system for an OFDM transmitter according to the principles of the present invention are described below as the complementary encoding and modulation system might be implemented to provide a more efficient and less costly OFDM transmitter with a reduced peak-to-average power ratio for the transmitted signal.

An eight (8) carrier system will be used for the following embodiments, but the principles of the present invention apply to OFDM transmitters using other numbers of carriers. Complementary codes can be used for OFDM systems with N carriers, where N is a power of 2. The implementation alternatives readily generalize to a system with $2^n$ carriers. In these particular embodiments, phase shift keying (PSK) is used for modulation. PSK applies variable phase shifts to the carriers to encode data bits. For M-phase shift keying, possible phase shifts are multiples of $2\pi/M$ radians. As a phase shift of $2\pi$ is identical to a shift of 0 radians, M different phase shifts are possible with each phase shift encoding $\log_2 N$ bits. In this particular embodiment, 8-PSK is used which corresponds to an 8 point constellation encoding three (3) data bits. Different constellation sizes are possible. The 8-PSK modulation allows the encoding of three (3) bits on every carrier, which, when multiplied by the number of carriers, yields 24 bits per channel symbol. Since complementary codes of length 8 are used with these particular embodiments and have a rate of 0.5, twelve (12) data bits can be encoded. Again, the described embodiments readily generalize to M-PSK where M is a power of 2, i.e. $M=2^m$.

FIG. 1 shows an OFDM transmitter system 10. Twelve (12) data bits from a date source 11 are grouped into 4 data symbols $d_0$, $d_1$, $d_2$, and $d_3$, each encoding 3 bits. As such, the decimal representation of their value can range from 0 to 7. The data symbols are input into Gray encoders 12 where, as usual in phase modulation, the vector $d=(d_k)$ is mapped onto vector x, of which the k-th element is constructed by Gray-encoding $d_k$. For 8-PSK, the constellation map is given by {0,1,3,2,7,6,4,5 }. Multiplier 13 can be used to scale the number of bits per symbol per carrier as will be discussed below.

The data bits of the vector x enter the complementary matrix multiplication block 14 where the vector $x=(x_i)$, (i=0 . . . 3) is then mapped onto the vector $y=(y_k)$, (k=0 . . . 7) according to $$y=xG. \tag{1}$$

G is a complementary code transformation matrix of ones and zeroes, which in this example is given by:

$$G=\begin{bmatrix}1&1&1&1&1&1&1&1\\0&0&0&0&1&1&1&1\\0&0&1&1&0&0&1&1\\0&1&0&1&0&1&0&1\end{bmatrix}$$

In general, the matrix G is an N x (1+log N) matrix containing one all-unity row. The remaining rows, when transposed, form the binary representation of the numbers N--1 . . . 0. Note, G's columns use a regular pattern which could be reversed.

In this particular embodiment, adders 16 implement the multiplication by matrix G to obtain the vector y. The adders 16 represent modulo 8 (M) adders (i.e. 3 bit wide adders). The vector y is mapped onto the 8 complex carrier phasors or phase shifts as follows:

$$C_k(i)=K_k\cdot e^{j\cdot y_k\cdot 2\pi/M} \tag{2}$$

for k=0,1, . . . ,7 and K is a kernel vector with elements k. that can either be 1 or −1. In these particular embodiments, the kernel vector is K=(1,−1, 1, 1,−1,1,1,1) and the multiplication by the kernel vector completes the complementary code transformation. Complementary phase mappers 18 provide eight (8) complementary carrier phase shifts using the vector y and the kernel vector according to equation 2. In this particular embodiment, the complementary constellation mappers 18 translate the input (which has M possible values) into an 8-PSK constellation, outputting a real (in-phase) and an imaginary (quadrature) value of the $c_k$ to an IDFT block 22. The—W blocks of the complementary constellation mappers 18 correspond with negative kernel elements and multiply their output with −1 according to the complementary code transformation. In this particular embodiment, the complementary constellation mappers 18 provide the complementary complex carrier phase shifts as 2×8 bits to represent real and imaginary parts of $c_i$. Other numbers could be used depending on accuracy requirements. For 8-PSK, the mappers 18 can be implemented as a look-up table (LUT) with the 8-bit quantized version of table 1 as content, yielding an 8×16 bit look-up table. The -W LUTs are a negated version of the W LUTs which implement the kernel vector as part of the complementary code transformation discussed above.

TABLE 1

8-PSK look up table

| Address | I | Q |
|---|---|---|
| 0 | 1 | 0 |
| 1 | 1/√2 | 1/√2 |
| 2 | 0 | 1 |
| 3 | −1/√2 | 1/√2 |
| 4 | −1 | 0 |
| 5 | −1/√2 | −1/√2 |
| 6 | 0 | −1 |
| 7 | 1/√2 | −1/√2 |

The complementary complex carrier phase shifts are input into a 16-point IDFT (Inverse Discrete Fourier Transform) 22. The IDFT 22 is applied to the complementary carrier phase shifts $c=[c_i]$, converting the individual carrier phase shifts into a time series or OFDM symbol consisting of 16 elements. For an N-carrier system, a 2N-point (or more) IDFT 20 is used. For example, in this particular embodiment the eight (8) complementary complex carrier phase shifts are input into the IDFT 20 to produce the OFDM symbol of 16 elements. Such two-fold (or more) oversampling is required to reduce aliasing effects which introduce unwanted frequency distortion due to (intended or unintentional) low pass filtering in subsequent stages of the transmitter or in the transmission channel.

The output of the IDFT 22 is input to the cyclic prefixer and windowing block 24. Note, the resultant time series plus the guard time may be longer than a symbol time. In other words, subsequent symbols may overlap. The cyclic prefixer and windowing block 24 augments the OFDM symbol with a cyclic prefix, which is then convolved with a windowing function and then sent to the transmitter front-end. Control circuitry 26 can provide scaling features to the OFDM transmitter 10 as will be discussed below.

FIG. 1 shows that in this particular embodiment the number of dual-input adders needed to implement the complementary encoding is equal to the total number of ones in the binary representations of 0,1, . . . , N-1. This number is equal to N/2) log N, i.e. 12 in this example. This number can be reduced to N-1 by adopting the complementary encoding arrangement 28 of adders (all modulo M) of FIG. 2. The example shown here is for an 8 carrier system, which reduces the number of adders from 12 to 7. Extensions to a larger number of carriers is straightforward.

The 2N-point IDFT formula for transforming the complementary carrier phase shifts $c_k$ to a OFDM symbol time series s(i) is:

$$s(i) = \sum_{k=0}^{2N-1} c_k \exp(j2\pi ik/16) \text{ for } i = 0, 1, \ldots, 15$$

reveals that the IDFT 24 comprises additions and constellation mapping, just as the encoding does. A minor difference is that the LUTs 20 contain a K=16 point constellation (in general K=2N) instead of an 8 (M in general ) point constellation. With W=exp(j2π/16) for convenience, the combined encoding and IDFT modulation equation is:

$$\begin{aligned} s(i) = {} & W^{2\cdot(x_0)}\cdot W^{0\cdot i} - \\ & W^{2\cdot(x_0+x_3)}\cdot W^{1\cdot i} + \\ & W^{2\cdot(x_0+x_2)}\cdot W^{2\cdot i} + \\ & W^{2\cdot(x_0+x_2+x_3)}\cdot W^{3\cdot i} - \\ & W^{2\cdot(x_0+x_1)}\cdot W^{4\cdot i} + \\ & W^{2\cdot(x_0+x_1+x_3)}\cdot W^{5\cdot i} + \\ & W^{2\cdot(x_0+x_1+x_2)}\cdot W^{6\cdot i} + \\ & W^{2\cdot(x_0+x_1+x_2+x_3)}\cdot W^{7\cdot i} \end{aligned}$$

which, by decomposing the multiples of i, can be rewritten as:

$$\begin{aligned} s(i) = {} & W^{2\cdot(x_0)+(0)\cdot i} - \\ & W^{2\cdot(x_0+x_3)+(1)\cdot i} + \\ & W^{2\cdot(x_0+x_2)+(2)\cdot i} + \\ & W^{2\cdot(x_0+x_2+x_3)+(2+1)\cdot i} - \\ & W^{2\cdot(x_0+x_1)+(4)\cdot i} + \\ & W^{2\cdot(x_0+x_1+x_3)+(4+1)\cdot i} + \end{aligned}$$

-continued $$\begin{aligned} & W^{2\cdot(x_0+x_1+x_2)+(4+2)\cdot i} + \\ & W^{2\cdot(x_0+x_1+x_2+x_3)+(4+2+1)\cdot i} \end{aligned}$$

Rearranging yields:

$$\begin{aligned} s(i) = {} & W^{2\cdot x_0} - \\ & W^{2\cdot x_0+(2\cdot x_3+1\cdot i)} + \\ & W^{2\cdot x_0+(2\cdot x_2+2\cdot i)} + \\ & W^{2\cdot x_0+(2\cdot x_2+2\cdot i)+(2\cdot x_3+1\cdot i)} - \\ & W^{2\cdot x_0+(2\cdot x_1+4\cdot i)} + \\ & W^{2\cdot x_0+(2\cdot x_1+4\cdot i)+(2\cdot x_3+1\cdot i)} + \\ & W^{2\cdot x_0+(2\cdot x_1+4\cdot i)+(2\cdot x_2+2\cdot i)} + \\ & W^{2\cdot x_0+(2\cdot x_1+4\cdot i)+(2\cdot x_2+2\cdot i)+(2\cdot x_3+1\cdot i)} \end{aligned}$$

Figure 3:
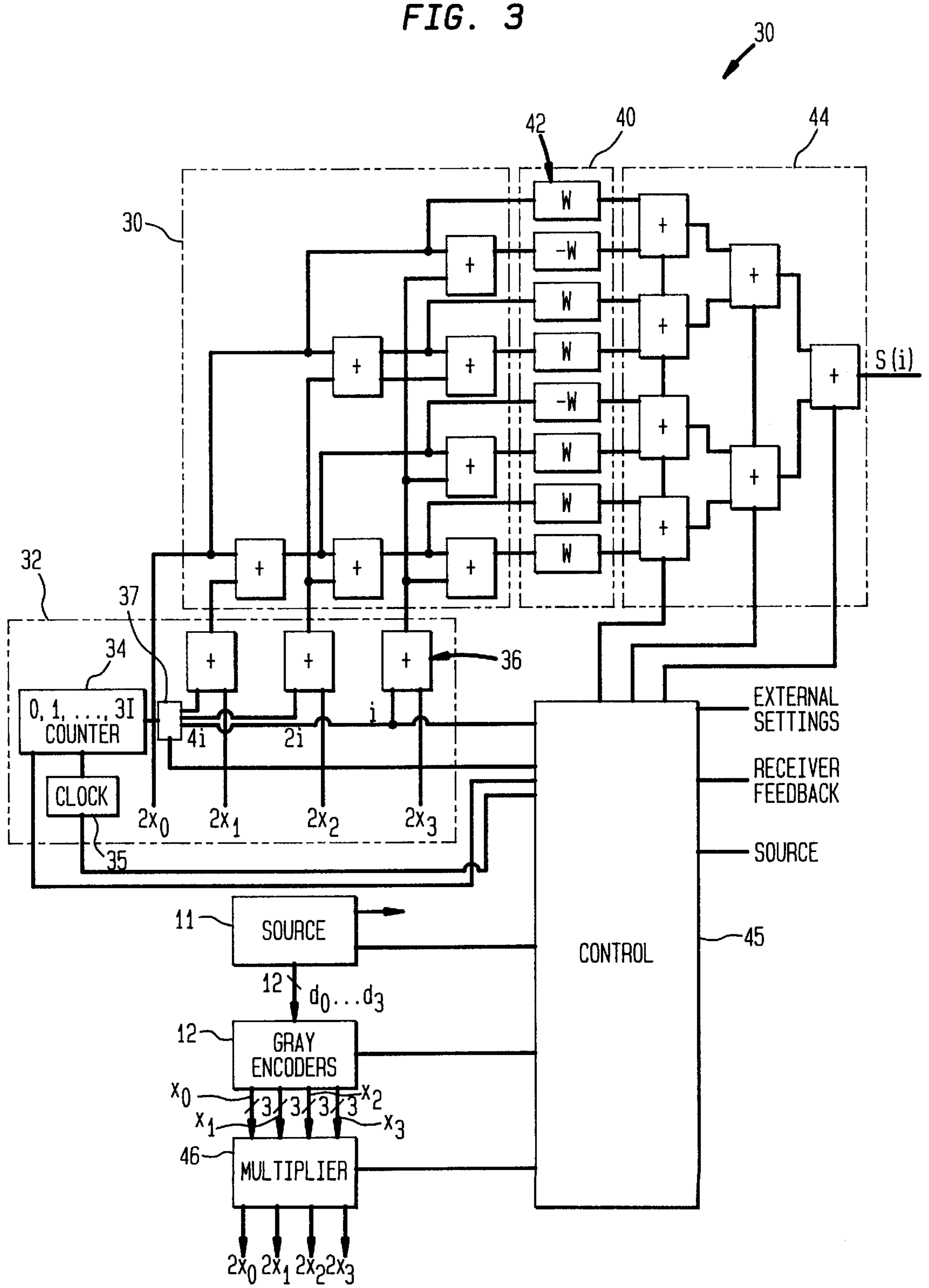
FIG. 3 shows a block diagram of one embodiment of the combined complementary encoding and modulation system for an OFDM transmitter according to the principles of the present invention which uses the complementary encoding arrangement of FIG. 2 and complementary constellation mappers.

Thus, by adding 4i, 2i, and i to multiples of the data inputs $x_1$, $x_2$, and $x_3$, the same adder structure that is used for complementary code encoding can be used to generate multiples of i, thereby providing a time base for OFDM modulation. Accordingly, FIG. 3 shows a combined complementary encoding and OFDM modulation system 30 in accordance with the principles of the present invention. The combined complementary encoding and modulation system 30 uses a time base generator 32 to provide a time base for OFDM modulation. In this particular embodiment, a counter 34 responsive to a clock 35 counts from 0 to 15 (2N-1 in general) to provide the time base i. The multiples 2i, and 4i, are obtained using shifted versions of i provided by block 37. A multiplier 46 performs default multiplication of 2N/M on the data inputs of $x_0$ . . . $x_3$ and manipulates the data inputs in response to the control circuitry 45 to provide the scaling feature described below for scaling the number of bits per symbol per carrier.

An extra adder arrangement 36 has three extra adders (log N in general are used to add i, 2i, and 4i to $x_1$ through $x_3$). The extra adder arrangement 36 combines the data inputs undergoing the complementary code transformation with the time base for OFDM modulation. The combined data inputs and time base are input into the adder arrangement 38. The adders of the extra adder arrangement 36 and the adder arrangement 38 are extended from mod 8 (M) to modulo 16 (2N) operation. The look-up tables 42 of the phase mappers 40 are extended from 8 to 16 entries. For the addition of all the N complementary carriers, N-1 complex adders (2N-2 real adders) are used, which can be put in a carrier adder arrangement 44 to generate the complementary coded OFDM symbol with the appropriate time base.

Control circuitry 45 provides the scaling of operating parameters for the OFDM transmitter 30 as will be discussed below. The control circuitry 45 responds to inputs of external settings, receiver feedback, and/or the data inputs to provide control signals to the data source 11, the Gray encoder 12, the time base arrangement 32, the time base adjust block 37, the multiplier 46 and/or the carrier adder arrangement 44. As such, the control circuitry 45 can scale the operating parameters and characteristics of the OFDM transmitter 30 to achieve the desired operating results.

Cyclic prefixing is accomplished by this design. As the counter 34 folds from 31 back to 0, the same waveform is repeated as long as the same $x_i$ are applied. If new data is applied, the counter is reset to 0 by the control circuitry 45 which is responsive to the data source 11. As such, when the control circuitry 45 determines that the OFDM transmitter 30 is ready for more data, the control circuitry 45 notifies the data source 11 to send more data, and the control circuitry 45 resets the counter 34. Note that a cyclic postfix is generated in this way. The look-up tables 42 can be reduced in size by a factor of 4, if just the first quadrant of the M-point constellation is listed, since the other 3 quadrants can be derived easily from the first. Another size reduction by a factor of 2 is possible for the 'even' look-up tables. Since $(2(\cdot)+k\cdot i)$ is even for all values of i if k is even, all odd entries can therefore be dropped from the even LUTs, yielding a total LUT memory reduction of 25%.

Thus, this particular embodiment provides a combined complementary encoding and modulation scheme that takes advantage of the similarity in complementary encoding and modulating to perform complementary encoding and OFDM modulation concurrently to generate a complementary coded OFDM symbol in real time and provide an efficient and less costly encoding and modulation system for an OFDM transmitter. This particular design provides advantages if the implementation technology favors additions because they are either cheaper, smaller, faster or more power efficient.

Figure 4:
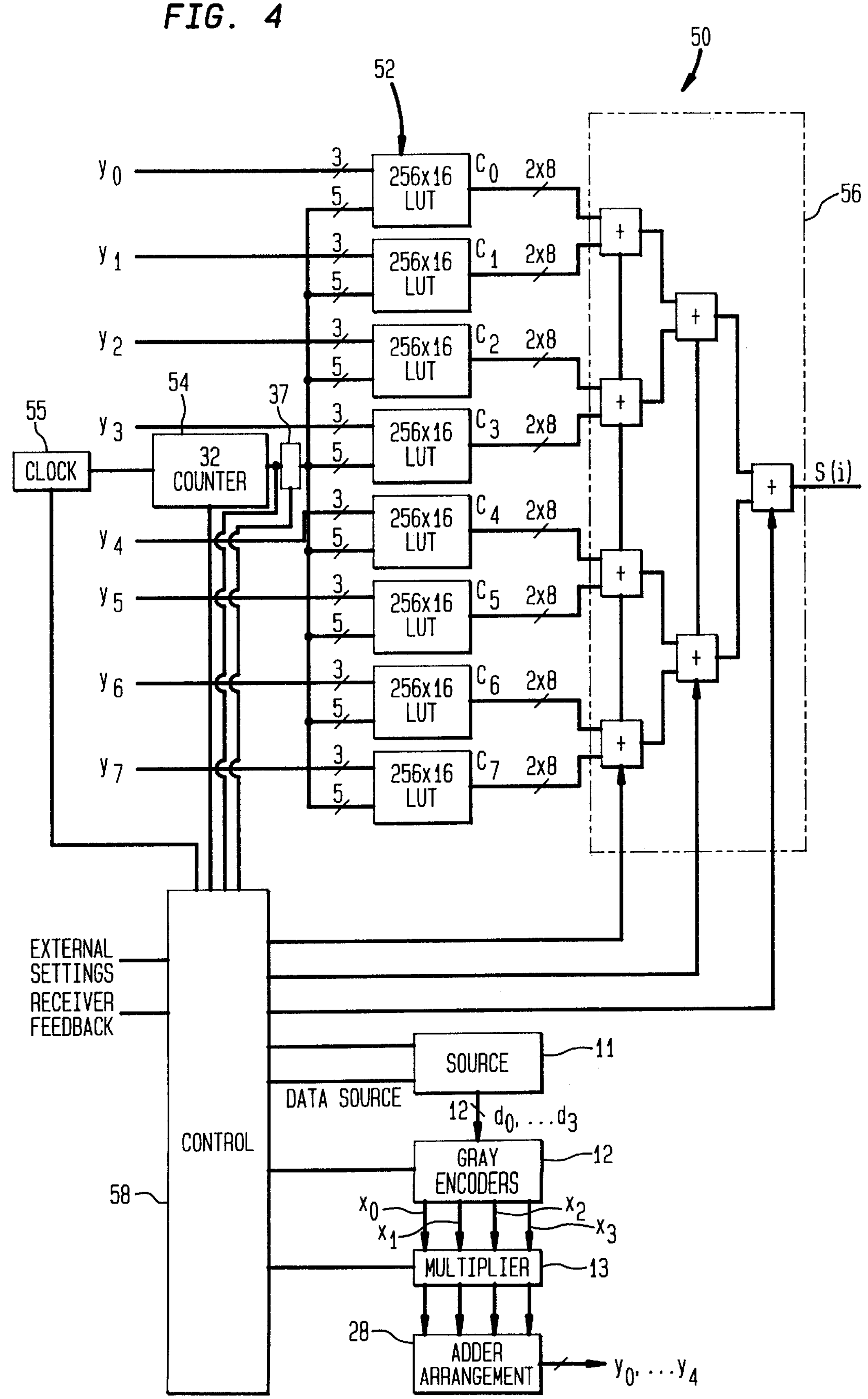
FIG. 4 shows a block diagram of another embodiment of the combined complementary encoding and modulation system for an OFDM transmitter according to the principles of the present invention using the complementary encoding arrangement of FIG. 2 and complementary and constellation mappers.

If an implementation technology is used where look-up memory is attractive, the combined complementary encoder and modulation system can be advantageously implemented as shown in FIG. 4. The combined complementary encoding and OFDM modulation system 50 uses a set of eight (8) look-up tables (LUTs) 52 that also include the windowing function. The LUTs 52 receive inputs $y_0 \ldots y_7$ from an adder arrangement 28 for performing complementary encoding as shown in FIG. 2.

Figure 2:
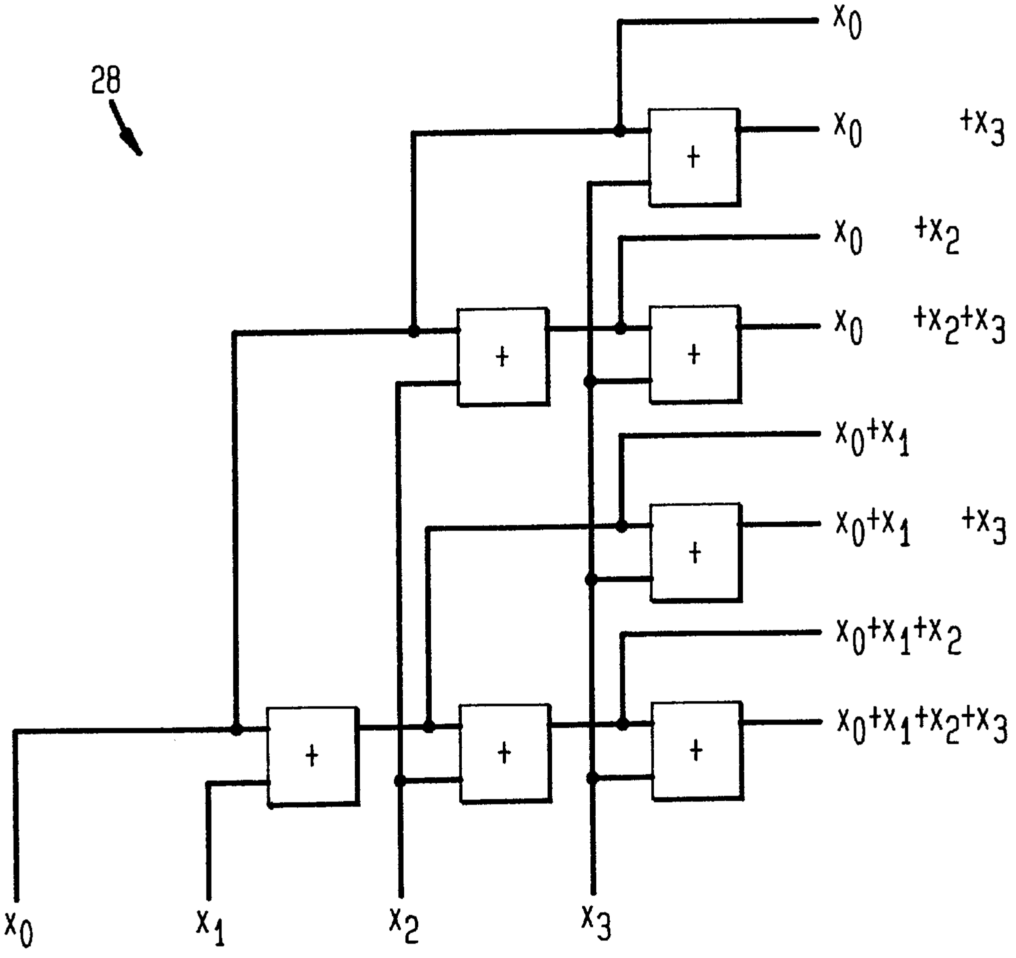
FIG. 2 shows a block diagram of a complementary encoding arrangement for use with certain embodiments of an OFDM transmitter according to certain principles of the present invention.

The various aspects of this particular embodiment include:

The translation from the data vector d to phase vector y, using the adder structure 28 shown in FIG. 2.

The multiplier 13 provides the scaling of the number of bits per symbol per carrier as discussed below.

A LUT 52 per complementary carrier $s_k(i)=c_k W^{ki}$, giving a total of 8 (N) LUTs 52, one for each k=0,1, . . . ,7. The LUTs 52 receive the data inputs which have undergone part of the complementary code transformation and the time base for OFDM modulation. In this particular embodiment, the LUTs 52 apply the kernel code as described for the previous embodiment to complete the complementary code transformation.

Each LUT 52 has eight (8, in general M) times series, one for every possible value of $y_k$=0,1, . . . ,7 (in general M−1)

A time series consists of 16+X (in general 2N+X) time samples, containing one symbol of 16 (2N) samples and a cyclic prefix of X samples. In practice X<2N. As such, 4N is a conservative estimate for the sample count generated from the time base generator or counter 54 which is responsive to clock 55.

Time sample i is weighted with a windowing function, for instance a raised cosine window.

An Adder tree 56, consisting of (N−1) complex adders, sums the N complementary carriers $S_k(i)$ to produce the OFDM symbol.

Control circuitry 58 responds to the data source 11, external settings and/or receiver feedback to provide cyclic prefixing and for scaling of operating parameters of the OFDM transmitter 50 as will be discussed below. To accomplish this, the control circuitry 58 provides control signals to the data source 11, the Gray encoder 12, the multiplier 13, the time base adjust block 37, the counter 54 and/or the carrier adder arrangement 56.

Where in the embodiment of FIG. 3, the look up tables 42 outputted the results of the function:

$$\text{output}=W^{input},$$

the LUTs 52 of this particular embodiment have transfer function $$\text{output}_k=W^{k \times input1+input2},$$

which means that the multiples of time base i are now calculated through the look-up tables 52 rather than through the complementary encoding adder structure 38 (FIG. 3). This particular embodiment also performs windowing, which would otherwise require an additional window LUT of 4N samples and a multiplier. Thus, this particular embodiment performs the windowing function while generating the OFDM symbol in real time.

In this particular embodiment, it is assumed that 16 bits suffice to represent a complex sample (8 bits for both in-phase and quadrature part.). In general, N look-up tables are required, each of which is containing M×4N complex samples. For this particular embodiment, this amounts to 8 tables of 256 complex samples if the cyclic prefix occupies half of the symbol.

The combined complementary coding-modulation expression can be rearranged to arrive at:

$$\begin{aligned} s(i) = [&W^{+0\cdot i} - W^{2\cdot(x_3)+1\cdot i} + \\ &W^{2\cdot(x_2)+2\cdot i} + W^{2\cdot(x_2+x_3)+3\cdot i} - \\ &W^{2\cdot(x_1)+4\cdot i} + W^{2\cdot(x_1+x_3)+5\cdot i} + \\ &W^{2\cdot(x_1+x_2)+6\cdot i} + W^{2\cdot(x_1+x_2+x_3)+7\cdot i}]W^{2\cdot x_0} \end{aligned}$$

which can be simplified to:

$$s(i)=[(W^{0\cdot i}+W^{2\cdot 2+2\cdot i}-W^{2\cdot x_1+4\cdot i}+W^{2\cdot(x_1+x_2)+6\cdot i})+W^{i+2\cdot x_3}(-W^{0\cdot i}+ W^{2\cdot x_2+2\cdot i}+W^{2\cdot x_1+4\cdot i}+W^{2\cdot(x_1+x_2)+6\cdot i})]W^{2\cdot x_0}$$

and further as:

$$s(i)=[((1-W^{2\cdot x_1+4\cdot i})+W^{2\cdot x_2+2\cdot i}(1+W^{2\cdot x_1+4\cdot i}))+W^{i+2\cdot x_3}(-(1-W^{2\cdot x_1+4\cdot i})+ W^{2\cdot x_2+2\cdot i}(1+W^{2\cdot x_1+4\cdot i}))]W^{2\cdot x_0}$$

Thus, the result of the following recursion:

$$S_0^{\pm}(i) = \pm W^{2\cdot x_0}$$

$$S_1^{\pm}(i) = S_0^{+}(i) \pm W^{2\cdot x_1+4\cdot i} \cdot S_0^{-}(i)$$

$$S_2^{\pm}(i) = S_1^{+}(i) \pm W^{2\cdot x_2+2\cdot i} \cdot S_1^{-}(i)$$

$$S_3^{\pm}(i) = S_2^{+}(i) \pm W^{2\cdot x_3+1\cdot i} \cdot S_2^{-}(i)$$

yields $s(i)=S_3-(i)$. This recursion can implemented according to the principles of the present invention as the combined complementary encoding and modulation system 60 of FIG. 5.

In this particular embodiment, the output from the time base generator 62, which is responsive to the clock 63, is manipulated by time base adjust block 37 to provide 2i and 4i to adder arrangement 64 as the time base for OFDM modulation. The data inputs $x_0 \ldots x_3$ from a Gray encoder 12 are doubled by block 46. The multiplier 46 performs a default multiplication 2N/M and also multiplies the data inputs $x_0 \ldots x_3$ to provide the scaling of the number of bits per symbol per carrier as described below. The doubled data inputs $x_1 \ldots x_3$ are received by adder arrangement 64 as part of the complementary code transformation. The input $2x_0$ and the outputs from the adder arrangement 64 are input into W blocks 66 which represent look-up tables (LUTs) 66. The LUTs 66 raise the multiples of i to the power of W, where W=exp(j2π/16). The outputs from the LUTs 66 enter the multiplication and addition arrangement 68 which produces the complementary coded OFDM symbol. Thus, this arrangement combines complementary encoding and modulation according to the principles of the present invention.

Control circuitry 69 responds to the data source 11, external settings and/or receiver feedback to provide cyclic prefixing and for scaling of operating parameters. To accomplish this, the control circuitry 69 provides control signals to the data source 11, Gray encoder 12, the time base adjust block 37, the multiplier 46, the counter 62, the clock 63, an offset block 71, and/or a signal selector 72.

In general, this design uses just log N multipliers 70a–c and as many additions/subtraction operations. This implementation is in particular suitable for (but not limited to) implementation in a digital signal processor, where multiplications are equally costly (i.e. fast) as additions, and addition and subtraction of two numbers can be performed in parallel. This design can be improved further by recognizing that the first multiplier 64a can be replaced by an adder, since $$W^{2 \cdot X0} \cdot W^{2X1+4 \cdot i} = W^{2X0+2X1+4 \cdot i}$$

Furthermore, $S_1^{\pm}(i)$ has a period of 4 (which means that it has to be evaluated just 4 times, for i=0,1,2 and 3, rather than 16 times for every value of i. Likewise $S_2^{\pm}(i)$ has a period of 8. These adjustments bring the number of multiplications down from 3 to (8+16)/16=1.5, for this example.

In accordance with other aspects of the present invention the control circuitry 26 (FIG. 1), 45 (FIG.3), 58 FIG. 4) and 69 (FIG. 5) provide scaleability of the operating characteristics can be achieved as discussed below by adjusting operating parameters and/or characteristics, such as the symbol time, the PSK constellation size, the number of carriers or the number of bits per symbol per carrier. By scaling the operating parameters and/or characteristics of the OFDM transmitter system when the control circuitry determines that different operating parameters and/or characteristics are advantageous, the control circuitry can dynamically change the operating parameters and/or characteristics for the OFDM transmitter. For example, by adapting the bit rate, widely varying signal bandwidths, delay spread tolerances and signal-to-noise ratio requirements can be achieved, thereby providing an attractive modulation scheme for the implementation of flexible, (dynamically) scaleable transmission systems.

The scaleable OFDM transmitters discussed above can be characterized by the various operating parameters, including the following:

number of carriers (N);

symbol duration (T);

number of bits per symbol per carrier (m); and the fraction of the symbol duration that is used as guard time.

By scaling these parameters, various operating characteristics can be scaled, including the following:

bit rate or data rate;

signal-to-noise ratio (the larger the SNR, the lower the bit error rate);

delay-spread tolerance;

signal bandwidth; and implementation complexity

The OFDM characteristics for these embodiments can be scaled in various ways:

A. To double the data rate of the improved OFDM transmitter:

1. Double the number of carriers. Delay spread tolerance remains the same, the signal bandwidth doubles and the implementation complexity is quadrupled (both number of operations and speed are doubled) for an IDFT implementation or by 2(n+1)/n if an IFFT implementation is used.

2. Halve the symbol duration. Delay spread tolerance is halved, signal bandwidth is doubled but implementation complexity is only increased with a factor of 2 (due to the speed-up by a factor of two).

3. Double the number of bits per symbol per carrier. Bandwidth and delay spread tolerance do not change, but a higher SNR should be used to obtain the same bit error rate.

B. To double the delay spread tolerance:

1. Double the symbol period, the bit rate is halved, but implementation complexity is reduced a factor of 2 (speed is halved) as well.

2. As B.1, but compensate the loss in bit rate according to A.1. The implementation complexity will be doubled (number of operations is doubled, speed remains the same). For an IFFT implementation complexity increases by a factor of 2 (n+1)/n.

3. As B.1, but compensate the loss in bit rate according to A.3. This will result in an SNR reduction.

C. To increase SNR performance:

1. Halve the number of bits per symbol per carrier. The price is a 2-fold reduction of the bit rate.

2. As C.1, but compensate the loss in bit rate according to A. 1. The net cost is a 4-fold implementation complexity (2(n+1)/n for IFFT) and a double signal bandwidth.

3. As C.1, but compensate the loss in bit rate according to A.2. The net cost is a 2-fold implementation complexity and a 2-fold reduction of the delay spread tolerance.

There are two additional operating parameters which can be scaled:

1. The ratio of guard time and symbol time. Changing this ratio affects SNR (a larger relative guard time claims energy that would otherwise go into the signal) and bit rate (a larger relative guard time reduces the bit rate) and the delay-spread tolerance (a larger relative guard time improves the resistance against delay-spread).

2. The coding rate. In general, a channel code is applied to reduce the rate of bit errors caused by OFDM-specific channel impairments. The rate of such a code can be varied to trade off bit rate against bit error rate. A code rate decreases with an increasing number of channels. Instead of doubling the code length when doubling the number of carriers, it is also possible to apply the same code twice, one to each half of the carriers, thereby retaining the code rate, but increasing the PAP ratio.

Another possible application of the reduction of the number of carriers is to enable multi-point communications system, consisting of a head end and a number of remote terminals. Multi-point communications systems can be used to implement multiple access of multi-rate systems. For example, one terminal could be sending on just one carrier, another one on 4 other, while a third one could be sending on yet another 2 carriers, all at the same time. For proper decoding it is mandatory that the signals of all carriers (from different terminals) are received with roughly equal relative delays by the head end.

With particular reference to the embodiments above, the control circuitry 26 (FIG. 1), 45 (FIG. 3), 58 (FIG. 4) and 69 (FIG. 5) can cause the scaling of symbol duration by adjusting the rate at which the time generator or counter is clocked.

Figure 5:
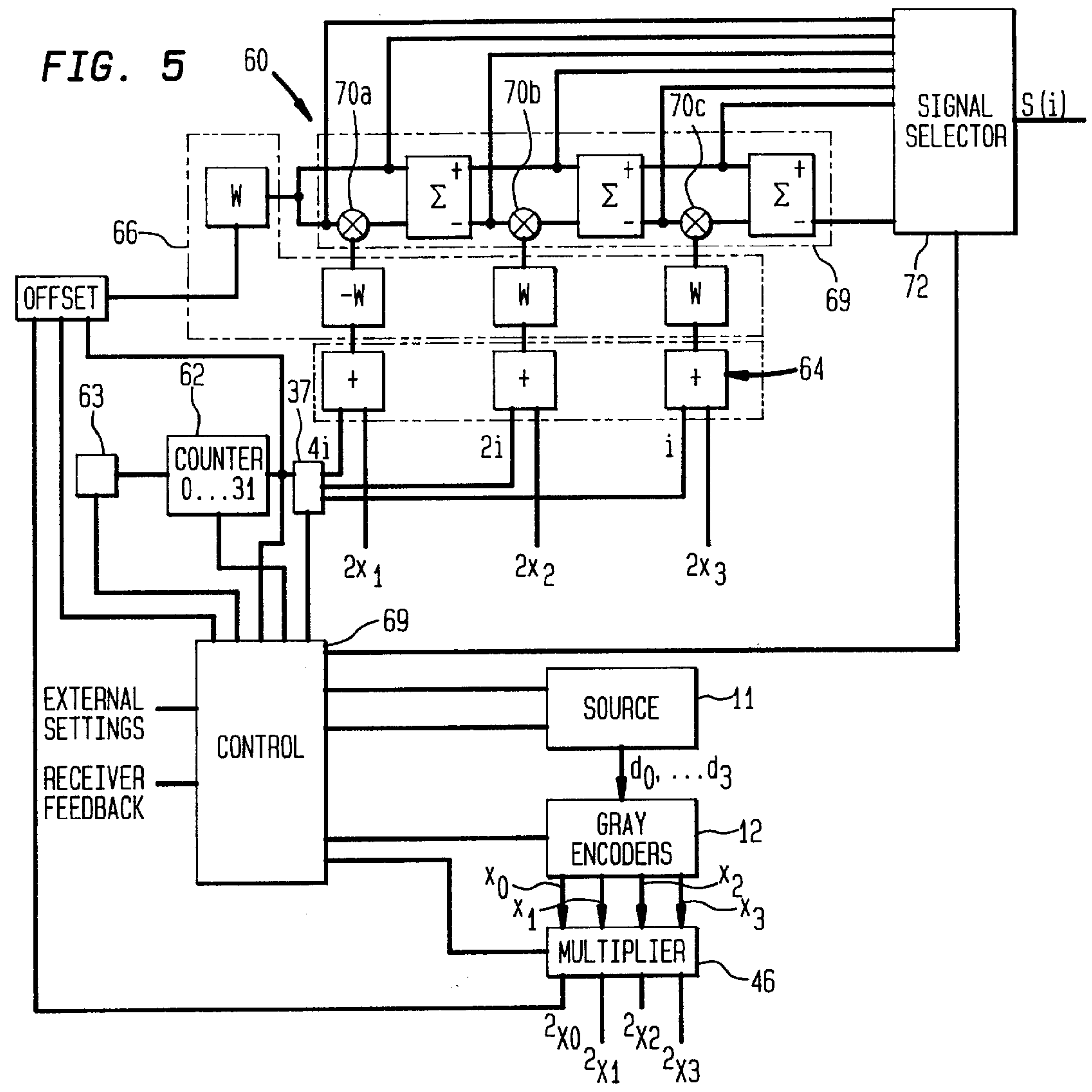
FIG. 5 shows a block diagram of another embodiment of the combined complementary encoding and modulation system for an OFDM transmitter using a recursive arrangement for performing combined complementary encoding and modulation according to the principles of the present invention.

To scale the number of bits per symbol per carrier, consider the reduction from 8-PSK to QPSK (Quaternary or 4-PSK) modulation on the carriers. This is simply done by allowing phases which are a multiple of $\pi/4$ only. In the embodiments above, such a result can be achieved by the control circuitry 26, 45, 58 and 69 controlling the data inputs to the Gray encoder 12 such that only the two LSBs (least significant bits) of the data inputs to the Gray encoder bank are used (in the case of 4-PSK). The control circuitry 26 (FIG. 1), 45 (FIG. 3), 58 (FIG. 4) and 69 (FIG. 5) provides control signals to the data source 11 to signal a reduction in the number of data input bits and provides control signals to the multiplier 13 (FIGS. 1 and 4) and 46 (FIGS. 3 and 5) which performs the appropriate operation depending on the desired scaling. In the 4-PSK embodiment, the output of the Gray encoder 12 shall be multiplied by 2 (i.e. shifted left one position) by the multiplier 13 (FIGS. 1 and 4) and 46 (FIGS. 3 and 5). Alternatively, if only the LSB of the data inputs is used, the Gray encoder output is multiplied by 4 (shifted left by two positions), thereby the encoding scheme reverts to BPSK (Binary, or 2-PSK).

In scaling the number of carriers, the combined complementary encoding and modulation system can be reduced to transmit on just one carrier, reducing the bit rate to ⅛th of the maximum. It is also possible to transmit on two arbitrary carriers. If 4 carriers are chosen arbitrarily, then it is no longer guaranteed that the generated code is complementary. However, carrier subsets $\{s_0,s_2s_4s_6\}$ and $\{s_1,s_3,s_5,s_7\}$ do produce complementary codes again. Even though a length 2 code is guaranteed to be complimentary, it is advantageous to limit the 2-carrier subsets to the following subsets: $\{s_0,s_4\}$, $\{S_1S_5,\}$ $\{S_2,S_6\}$ and $\{s_3,s_7\}$, which have a maximal stride across the set of carriers. For larger N, complementary subsets can be generated in similar fashion.

To scale the number of carriers, the control circuitry 26 (FIG. 1), 45 (FIG. 3), 58 (FIG. 4), and 69 (FIG. 5) can provide control signals to achieve the following ways to scale the number of carriers:

1. The first scheme involves using only part (4, 2 or 1 out of 8) of the carriers, for instance $c_0$ and $c_4$. This option is particularly interesting to implement OFDM-based multiple access where a given band is shared between many users. It is advantageous to separate the carriers as far apart as possible to improve resilience against frequency selective fading—the chance that 2 separated bands are in a fade is less than the chance for 2 adjacent bands.

2. The second scheme involves using only part (4, 2 or 1 out of 8) of the phases, for instance $c_0$ and $c_4$, but to modulate them onto adjacent carriers, $s_0$ and $s_1$. This possibility is preferable if the encoder has to operate in a channel with a smaller available bandwidth.

Figure 6:
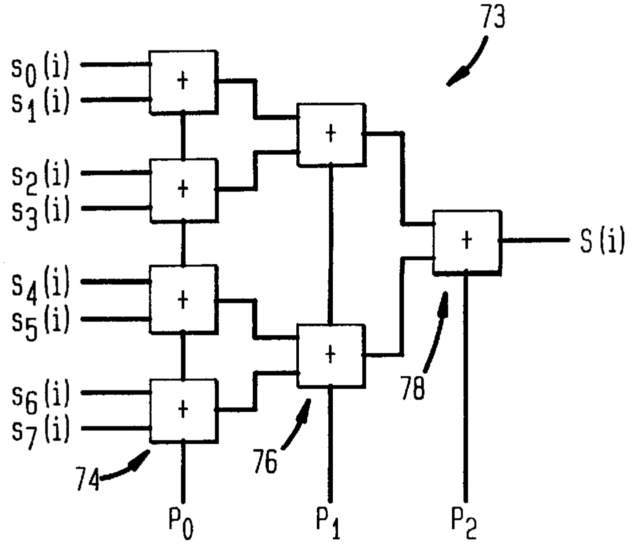
FIG. 6 shows a block diagram of a carrier adder arrangement for certain scaleable embodiments of the OFDM transmitter according to certain principles of the present invention.

With particular reference to the embodiments of FIGS. 3 and 4, a multiple access system with a scaleable number of carriers according to the first scheme can be constructed by modifying the carrier adder tree 44 (FIG. 3) and 56 (FIG. 4) as shown in FIG. 6. In this particular embodiment, each adder of the adder arrangement 73 has respective control inputs p from the control circuitry 45 (FIG. 3) and 58 (FIG. 4) that can assume values A, B and Σ. In the A position, the adder produces one of its input (the upper one in this particular embodiment) on the output. In the B position the other input is connected to the output. In the Σ position, the sum of both inputs is produced. Each column 74–78 of adders shares the same control input. Hence there are 3 (log N in general) control inputs $p_0$–$p_2$. Table 2 lists the values that, applied to the adder control inputs, produce the various carrier sets. The 8-carrier embodiments generalize to larger powers of 2.

TABLE 2

Adder tree control values for scaleable operation of embodiments of FIGS. 3 and 4

| $S_2$ | $S_1$ | $S_0$ | band-width | carrier set | inputs used |
|---|---|---|---|---|---|
| Σ | Σ | Σ | 8 | $\{S_0, S_1, S_2, S_3, S_4, S_5, S_6, S_7\}$ | $X_0, X_1, X_2, X_3$ |
| Σ | Σ | A | 4 | $\{S_0, S_2, S_4, S_6\}$ | $X_0, X_1, X_2$ |
| Σ | Σ | B | 4 | $\{S_1, S_3, S_5, S_7\}$ | $X_0, X_1, X_2$ |
| Σ | A | A | 2 | $\{S_0, S_4\}$ | $X_0, X_1$ |
| Σ | A | B | 2 | $\{S_1, S_5\}$ | $X_0, X_1$ |
| Σ | B | A | 2 | $\{S_2, S_6\}$ | $X_0, X_1$ |
| Σ | B | B | 2 | $\{S_3, S_7\}$ | $X_0, X_1$ |
| A | A | A | 1 | $\{S_0\}$ | $X_0$ |
| A | A | B | 1 | $\{S_1\}$ | $X_0$ |
| A | B | A | 1 | $\{S_2\}$ | $X_0$ |
| A | B | B | 1 | $\{S_3\}$ | $X_0$ |
| B | A | A | 1 | $\{S_4\}$ | $X_0$ |
| B | A | B | 1 | $\{S_5\}$ | $X_0$ |
| B | B | A | 1 | $\{S_6\}$ | $X_0$ |
| B | B | B | 1 | $\{S_7\}$ | $X_0$ |

For the embodiment of FIG. 5, the carriers for a multiple access system according to the first scheme can be derived from the $S_k^{\pm}(i)$ signals as is shown in the first column of table 3. The multiplication by $\pm W^{ki}$ (addition of 8 is used to implement the negation) can be implemented simply by adding ki (+8) to $2x_0$, at offset block 71 and selecting the appropriate carriers or tapping the appropriate signals using signal selector 72 as directed by control signals from the control circuitry 69 (FIG. 5) to the offset block 71 and the signal selector 72.

TABLE 3

Scaleable operation of implementation alternative 3.

| Signal | band-width | carrier set | inputs used |
|---|---|---|---|
| $S_3^-(i) \cdot W^{0i}$ | 8 | $\{S_0, S_1, S_2, S_3, S_4, S_5, S_6, S_7\}$ | $X_0, X_1, X_2, X_3$ |
| $S_2^+(i) \cdot W^{0i}$ | 4 | $\{S_0, S_2, S_4, S_6\}$ | $X_0, X_1, X_2$ |
| $S_2^-(i) \cdot W^{1i+8}$ | 4 | $\{S_1, S_3, S_5, S_7\}$ | $X_0, X_1, X_2$ |
| $S_1^+(i) \cdot W^{0i}$ | 2 | $\{S_0, S_4\}$ | $X_0, X_1$ |
| $S_1^+(i) \cdot W^{1i+8}$ | 2 | $\{S_1, S_5\}$ | $X_0, X_1$ |
| $S_1^-(i) \cdot W^{2i}$ | 2 | $\{S_2, S_6\}$ | $X_0, X_1$ |
| $S_1^-(i) \cdot W^{3i}$ | 2 | $\{S_3, S_7\}$ | $X_0, X_1$ |
| $S_0^+(i) \cdot W^{0i}$ | 1 | $\{S_0\}$ | $X_0$ |
| $S_0^-(i) \cdot W^{1i}$ | 1 | $\{S_1\}$ | $X_0$ |
| $S_0^+(i) \cdot W^{2i}$ | 1 | $\{S_2\}$ | $X_0$ |
| $S_0^+(i) \cdot W^{3i}$ | 1 | $\{S_3\}$ | $X_0$ |
| $S_0^-(i) \cdot W^{4i}$ | 1 | $\{S_4\}$ | $X_0$ |
| $S_0^+(i) \cdot W^{5i}$ | 1 | $\{S_5\}$ | $X_0$ |
| $S_0^+(i) \cdot W^{6i}$ | 1 | $\{S_6\}$ | $X_0$ |
| $S_0^+(i) \cdot W^{7i}$ | 1 | $\{S_7\}$ | $X_0$ |

It is also possible to bring down the number of carriers just to reduce the signal bandwidth (and not to allow multi-user access) according to the second scheme. For instance, a 4 channel system, which in multiple access mode uses carriers, $s_1$, $s_3$, $s_5$ and $s_7$, would have to be mapped onto carriers $s_0$, $s_1$, $s_2$ $s_3$. Such a reduction in signal bandwidth can be accomplished by subtracting 1 from i dividing the result by 2. Analogous solutions exist for other carrier sets. Such scaling can be implemented by means of the time base adjust block 37 that operates on the counter output as directed by the control circuitry 45 (FIG. 3) 58 (FIG. 4) 69 (FIG. 5).

To scale guard time, the control circuitry 45 (FIG. 3), 58 (FIG. 4) and 69 (FIG. 15 5) permits the counters 34 (FIG. 3), 54 (FIG. 4) and 62 (FIG. 5) to count through until 2N+X, where X is the desired guard time, measured in counter clock intervals. As such, the control circuitry 45 (FIG. 3), 58 (FIG. 4) and 69 (FIG. 5) can control scaling of the guard time. For the embodiment of FIG. 4, there is a maximum to the guard time since the look up table size is finite. However, as noted before, it does not seem practical to make X larger than 2N (otherwise more than 50% of the signal power would go into the guard time), and the look up table can be dimensioned accordingly to that maximum.

The coding rate is directly related to the number of carriers N by 1 +$\log_2$ N/N. To double the number of carriers from 8 to 16, for example, there are two options for selecting the code rate. Either the number of carriers is doubled, as is the length of the complementary code, or the system is composed of two 8-channel systems. In the first case, the regularity of the embodiments enable the scaling to 16 carriers in a straightforward way. The code rate for this example drops from ½ to 5⁄16. Thus, the bit rate increases from 12 to just 15 bits per symbol. The implementation complexity doubles for the embodiments of FIGS. 3 and 4, and increases logarithmically for the embodiment of FIG. 5. For the second case, in the embodiment of FIG. 5, the data rate doubles from 12 bit per symbol to 24 bits per symbol, but the PAP ratio increases as well. For instance, if two data words which result in maximum PAP ratio (6 dB) are applied to each of the 8 channel systems, the resulting PAP ratio produced by the 16 carrier system is 9 dB.

Ideally, the carriers of the 8 channel system are interleaved. This can be achieved by using two independent encoders and a single 32 point IDFT (to cope with 2×8 channels as well as double oversampling). The outputs of encoder one are applied to the even inputs of the IDFT, the outputs of decoder 2 are applied to the odd inputs. If count i is multiplied by 2, the s(i) represents the waveform produced by the even carriers. If i is multiplied by 2 and 1 is added, the odd carriers' waveform is produced. Because of the linearity of the IDFT operation the two waveforms can simply be added to produce the interleaved signal. As a result the hardware complexity doubles. These and other adaptations that can be made in the implementation embodiments discussed above would be understood by one of skill in the art with the benefit of this disclosure.

Table 4 lists the implementation complexity of the embodiments of FIGS. 3–5. H represents the number of bits required to represent a real number. Hence 2H bits represent a complex number. A complex adder consists of 2 real adders, i.e. its complexity equals 2H. A complex multiplier can be implemented using 4 real (H-bit multiplications) and 3 real (H-bit) additions. (It is also possible to use just 3 real multiplications and 5 real additions). Finally, N* is shorthand for min(M,2N). To make a fair comparison of these embodiments, the complexity measure of the windowing function which is not included in the embodiments of FIGS. 3 and 5, is based on a window implementation consisting of 1) a complex-by-real multiplier (consisting of 2 real multipliers) and 2) a look-up table containing 4N real samples (4N×H).

TABLE 4

Implementation complexity

| Functions | Alternative 1 | Alternative 2 | Alternative 3 |
|---|---|---|---|
| ADD | log N × log N* + (N − 1) × log N* + (N − 1) ×2H | (N − 1) × log M + (N − 1) × 2H | 2 log N × H + log N × 2H |
| LUT | N × N* × 2H + 4N × H | N × M × 4N × 2H | (log N +1) × 2N + 4N × H |
| MUL | 2H | 0 | log N × 4H + 2H |

This table can be used to choose the appropriate alternative for the implementation technology. For example, for field programmable gate arrays, a 1 bit adder uses about 16 times as much space as a single bit of look-up table memory, while a 1 bit multiplier uses 16 times as much space as single bit adder. Using a single LUT bit as the unit of complexity, the embodiment of FIG. 3 yields the smallest (not necessarily fastest, or most power efficient) FPGA implementation for the 8 carrier system used as an example. For a digital signal processor, where addition, multiplication and table look-up have comparable complexity (in terms of speed), the embodiment of FIG. 5 is advantageous.

As such, the improved complementary encoding and modulation system for a OFDM (Orthogonal Frequency Division Mulitplexing) transmitter uses complementary codes to reduce the peak-to-average power ratio of the transmitted signal. The above describes embodiments of the improved complementary encoding and modulation system that efficiently generates in real time a complementary OFDM symbol by combining the complementary encoding of the data inputs and the frequency multiplexing. Depending on the application, each design possesses certain advantages. For example, the embodiment of FIG. 3 is advantageous if the implementation technology favors additions, either because they are cheap, small, fast, or have good power efficiency. The embodiments of FIGS. 4 and 5 are advantageous if look-up tables or multiplications, respectively, have those benefits. The embodiments of FIGS. 3 and 4 scale linearly with the number of carriers. The embodiment of FIG. 5 scales logarithmically with the number of carriers, but uses multiplications, which in general have the largest cost of implementation. All designs are intrinsically scaleable, i.e. they are easily adapted to a longer symbol duration, a smaller number of carriers or a reduced number of bits per symbol per carrier. Scaling allows OFDM systems to operate in a variety of environments. By dynamically scaling the operating parameters, widely varying bit rates, signal bandwidth, delay spreads tolerance and signal-to-noise ratio requirements can be achieved.

The complementary encoding and modulation system is efficient and reduces costs because encoding and modulation are done in parallel using the same hardware. Costs can be further reduced by choosing the appropriate embodiment for the application, and the scaleability feature provides flexibility. In addition to the embodiments described above, alternative configurations of the complementary encoder and modulation system are possible which omit or add components or use different components in performing the above-described complementary encoding and modulation scheme or a variation thereof. For example, only portions of the described control circuitry can be used to provide a subset of the scaling features, or separate control circuitry can be used which are associated with the various transmitter components. Additionally, the above-described complementary encoding and modulation scheme has been described as being comprised of several components, but it should be understood that the complementary encoding and modulation system and portions thereof can be employed using application specific integrated circuits, software driven processing circuitry, or other arrangements of discrete components.

What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

We claim:

1. A method of transmitting signals for an OFDM transmitter comprising the steps of:

encoding data inputs using a complementary code to produce carrier phase shifts;

modulating carriers using said carrier phase shifts and adding multiples of a time base to provide the carrier phase shifts during said step of encoding to produce complementary carriers; and producing an OFDM symbol for transmission from said complementary carriers, wherein the OFDM symbol has an amplitude based on a kernel vector.

2. The method of claim 1 wherein said steps of encoding and modulating includes the step of:

applying a time base to said data inputs.

3. The method of claim 1 wherein said step of encoding and modulating includes the step:

using look up tables to implement portions of said steps of modulating and encoding of said complementary carriers.

4. The method of claim 3 further including the step of:

providing said data inputs to an adder arrangement for encoding said data inputs into said carrier phase shifts.

5. The method of claim 4 further including the step of:

providing said time base to said look-up tables.

6. The method of claim 3 further including the step of:

providing said time base to said adder arrangement.

7. The method of claim 3 further including the step of:

using expanded look-up tables such that the complexity of said steps of encoding and modulating scales linearly with the number of carriers and to perform windowing on said OFDM symbol.

8. The method of claim 1 wherein said steps of encoding and modulating includes the steps of:

multiplying said data inputs with a complementary code matrix; and applying a kernel vector to the results of said multiplication.

9. The method of claim 8 wherein said step of multiplying further includes the step of:

applying a time base to said data inputs for producing said carrier phase shifts.

10. The method of claim 8 further including the steps of:

applying a time base to the results of said multiplication.

11. The method of claim 1 wherein said step of producing includes the steps of:

using a carrier adder arrangement for summing said complementary carriers into said OFDM symbol; and reducing the number of complementary carriers by selective summing of complementary carriers by controlling said carrier adder arrangement.

12. The method of claim I wherein said step of producing includes the step of:

applying an offset to at least one of said data inputs;

tapping appropriate complementary carriers.

13. The method of claim 1 wherein said steps of encoding and modulating further include the step of:

providing a cyclic repetition of said complementary carriers.

14. The method of claim 1 further including the steps of:

reducing the number of complementary carriers and signal bandwidth by applying an offset and a division to said time base.

15. The method of claim 1 further comprising the step of:

decreasing a number of bits per data symbol per carrier by reducing a number of data inputs.

16. The method of claim 1 further including the step of:

scaling a bit rate by changing a symbol duration.

17. A method of transmitting signals for an OFDM transmitter comprising the steps of:

receiving data inputs;

generating complementary carrier signals by encoding said data signals according to a complementary code transformation and by modulating carriers in parallel to said encoding using multiples of a time base to provide the modulated carriers; and producing an OFDM symbol for transmission from said complementary carrier signals, wherein the OFDM symbol has an amplitude based on a kernel vector.

18. The method of claim 17 wherein said step of generating includes the steps of:

mapping said data signals and said time base into first vectors by adding respective ones of said data signals and said time base according to said complementary code transformation; and converting said first vectors into complementary carrier signals according to a kernel code of said complementary code transformation.

19. The method of claim 17 wherein said step of generating includes the steps of:

mapping said data signals into first vectors by adding respective ones of said data signals according to said complementary code transformation using a complementary code; and converting said first vectors into complementary carrier signals using said time base and according to a kernel code of said complementary code transformation.

20. The method of claim 17 wherein said step of producing includes the step of:

adding respective ones of said complementary carrier signals.

21. An OFDM transmitter system comprising:

a complementary encoding and modulation arrangement receiving data signals and multiples of a time base, said arrangement encoding said data inputs using a complementary code transformation and concurrently modulating complementary carriers using said multiples of the time base to provide the complementary carriers; and a carrier adder arrangement producing an OFDM symbol for transmission from said complementary carriers wherein.

22. The system of claim 21 wherein said complementary encoding and modulation arrangement maps said data signals and said time base into first vectors by adding respective ones of said data signals and said time base according to said complementary code transformation, said complementary encoding and modulation arrangement converts said first vectors into complementary carrier signals according to a kernel code of said complementary code transformation.

23. The system of claim 21 wherein said step complementary encoding and modulation arrangement maps said data signals into first vectors by adding respective ones of said data signals according to said complementary code transformation using a complementary code, said complementary encoding and modulation arrangement converts said first vectors into complementary carrier signals using said time base and according to a kernel code of said complementary code transformation.

24. The method of claim 1 further comprising the step of:

scaling a number of bits per symbol per carrier in response to a control signal.

25. The method of claim 24 wherein the scaling step further comprises:

multiplying input data by a multiplier to scale the number of bits per symbol per carrier;

adding the multiplied input data to the multiples of the time base to prepare for the encoding step.

26. The method according to claim 1 further comprising:

adjusting the scaling of symbol duration by changing a rate at which a counter is clocked.

27. The method according to claim 1 further comprising:

controlling the number of transmit carriers by configuring adder inputs of a carrier adder arrangement.

* * * * *